(12) United States Patent
Chen et al.

(10) Patent No.: US 10,280,788 B2
(45) Date of Patent: May 7, 2019

(54) AIRCRAFT POWER OUTTAKE MANAGEMENT

(71) Applicant: PRATT & WHITNEY CANADA CORP., Longueuil (CA)

(72) Inventors: Bryan Chen, Montreal (CA); Dariusz Chmiel, Pierrefonds (CA); Philippe Beauchesne-Martel, Brossard (CA); James Robert Jarvo, Saint-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 30 days.

(21) Appl. No.: 15/175,467

(22) Filed: Jun. 7, 2016

(65) Prior Publication Data

US 2016/0281529 A1 Sep. 29, 2016

Related U.S. Application Data (63) Continuation of application No. 13/753,158, filed on Jan. 29, 2013, now Pat. No. 9,382,010.
(Continued)

(51) Int. Cl.
*F01D 21/00* (2006.01)
*F02C 9/28* (2006.01)
(Continued)

(52) U.S. Cl.
CPC .......... *F01D 21/003* (2013.01); *B64D 31/06* (2013.01); *F02C 7/042* (2013.01); *F02C 9/26* (2013.01);
(Continued)

(58) Field of Classification Search
CPC ...... F02C 9/26; F02C 9/28; F02C 9/54; F02C 7/042; F01D 21/003
(Continued)

(56) References Cited

U.S. PATENT DOCUMENTS

| | | | |
|---|---|---|---|
| 4,529,887 A * | 7/1985 | Johnson | F02C 6/18 290/40 A |
| 4,687,946 A | 8/1987 | Jones | |

(Continued)

FOREIGN PATENT DOCUMENTS

| | | |
|---|---|---|
| EP | 2275346 A2 | 1/2011 |
| WO | WO 2002040844 | 5/2002 |

(Continued)

OTHER PUBLICATIONS

European Search Report dated Dec. 14, 2016 in connection with European Patent Application No. 13173975.7.
(Continued)

*Primary Examiner* — Nadeem Odeh
(74) *Attorney, Agent, or Firm* — Norton Rose Fulbright Canada (57) ABSTRACT

A system and method for controlling the operation of a gas turbine engine supplying power to an aircraft. The engine is controlled according to a reading of an amount of power drawn from the supplied power. The reading is fed directly to a control system, which issues commands for controlling engine parameters comprising an acceleration reference signal, load shedding, variable geometry positioning, and fuel flow. The control system may further issue commands for controlling the amount of power drawn. The control system may further use the reading to monitor the engine's condition.

13 Claims, 8 Drawing Sheets

Related U.S. Application Data (60) Provisional application No. 61/670,785, filed on Jul. 12, 2012.

(51) Int. Cl.
 *F02C 9/54* (2006.01)
 *B64D 31/06* (2006.01)
 *F02C 7/042* (2006.01)
 *F02C 9/26* (2006.01)
 *G05B 13/02* (2006.01)

(52) U.S. Cl.
 CPC .............. *F02C 9/28* (2013.01); *F02C 9/54* (2013.01); *G05B 13/024* (2013.01); *F05D 2220/323* (2013.01); *F05D 2260/83* (2013.01); *F05D 2270/053* (2013.01)

(58) Field of Classification Search
 USPC ........................................................ 701/100
 See application file for complete search history.

(56) References Cited

U.S. PATENT DOCUMENTS

| | | |
|---|---|---|
| 6,931,856 B2 | 8/2005 | Belokon et al. |
| 7,573,243 B2 | 8/2009 | Trainer et al. |
| 7,777,358 B2 | 8/2010 | Halsey et al. |
| 7,795,825 B2 | 9/2010 | Williams |
| 7,814,491 B1 | 10/2010 | Chen et al. |
| 7,969,038 B2 | 6/2011 | Cheng |
| 8,098,054 B2 | 1/2012 | Verschuur |
| 8,209,101 B2 | 6/2012 | Breit |
| 8,800,918 B2 | 8/2014 | Morris et al. |
| 2003/0131605 A1* | 7/2003 | Meisner ............... F02C 9/28 60/773 |
| 2005/0273206 A1 | 12/2005 | McGinley |
| 2006/0042252 A1 | 3/2006 | Derouineau |
| 2006/0174629 A1 | 8/2006 | Michalko |
| 2006/0220387 A1 | 10/2006 | Tsuzuki |
| 2008/0211237 A1 | 9/2008 | Berenger |
| 2009/0271086 A1 | 10/2009 | Morris et al. |
| 2010/0241331 A1 | 9/2010 | Duke et al. |
| 2010/0274416 A1 | 10/2010 | Poisson |
| 2010/0280682 A1* | 11/2010 | Lazarovich ........... H02J 3/14 701/3 |
| 2011/0056210 A1 | 3/2011 | Griffin et al. |
| 2011/0077895 A1 | 3/2011 | Muramatsu et al. |
| 2011/0178648 A1 | 7/2011 | Calvignac et al. |
| 2011/0213507 A1 | 9/2011 | Dooley |
| 2012/0146405 A1 | 6/2012 | Waite et al. |
| 2012/0211981 A1 | 8/2012 | De Wergifosse |
| 2014/0297155 A1 | 10/2014 | Chen et al. |

FOREIGN PATENT DOCUMENTS

| | | |
|---|---|---|
| WO | WO 2003044353 | 5/2003 |
| WO | WO 2012080633 | 6/2012 |
| WO | WO 2012123663 | 9/2012 |

OTHER PUBLICATIONS

Pratt & Whitney Canada Corp., "Know your PT6A Turboprop", Jun. 12, 2009 (version 8-1215 Archived).
Pratt & Whitney Canada Corp., "Know your Ptea Turboprop", Jun. 12, 2009 (version 8-1215 Archived).
MacIsaac et al. "Gas Turbine Propulsion System", Jul. 7, 2011, John Wiley & Sons, pp. 63-65.

* cited by examiner

AIRCRAFT POWER OUTTAKE MANAGEMENT

CROSS-REFERENCE TO RELATED APPLICATIONS

The present application is a continuation of U.S. patent application Ser. No. 13/753,158, filed on Jan. 29, 2013, the contents of which are hereby incorporated by reference in their entirety.

TECHNICAL FIELD

The application relates generally to a system and method for aircraft power outtake management and engine control.

BACKGROUND OF THE ART

Increasing levels of loading, which draws power from an engine to enable operation of the aircraft, are being proposed for future aircraft generations. However, information about the amount of power drawn by the aircraft loads is often not sufficiently reliable to be used for efficient management of power outtakes and control of the engine. As a result, aircraft engines are typically designed to meet scenarios where conservative power outtake estimates are made according to imposed engine installation limits. The performance of the engine is therefore not optimized and pilot workload is increased.

Therefore, there is a need for an improved system and method for aircraft power outtake management and engine control.

SUMMARY

In one aspect, there is provided a system for controlling a gas turbine engine supplying power to an aircraft. The system comprises a receiving unit adapted to receive a measurement signal comprising a measurement of a power outtake currently consumed by at least one load coupled to the engine and a processing unit. The processing unit is adapted to extract the measurement from the measurement signal; monitor a condition of the engine based on the measurement; generate a control signal as a command to dynamically modify the power outtake allowance when any one of the following occurs: the engine reaches a thermal limit, a temperature overshoot level of the engine reaches a threshold, and an unpredicted event occurs; and send the control signal to the engine for dynamically modifying the power outtake allowance.

In another aspect, there is provided a method for controlling a gas turbine engine supplying power to an aircraft. The method comprises receiving a measurement signal comprising a measurement of a power outtake currently consumed by at least one load coupled to the engine; extracting the measurement from the measurement signal; monitoring a condition of the engine based on the measurement; generating a control signal as a command to dynamically modify the power outtake allowance when any one of the following occurs: the engine reaches a thermal limit, a temperature overshoot level of the engine reaches a threshold, and an unpredicted event occurs; and sending the control signal to the engine for dynamically modifying the power outtake allowance.

In accordance with another broad aspect, there is provided a system for controlling a gas turbine engine supplying power to an aircraft, the apparatus comprising: means for receiving a measurement signal comprising a measurement of a power outtake currently consumed by at least one load coupled to the engine; means for extracting the measurement from the measurement signal; means for monitoring a condition of the engine based on the measurement; means for generating a control signal as a command to dynamically modify the power outtake allowance when any one of the following occurs: the engine reaches a thermal limit, a temperature overshoot level of the engine reaches a threshold, and an unpredicted event occurs; and means for sending the control signal to the engine for dynamically modifying the power outtake allowance.

DESCRIPTION OF THE DRAWINGS

Reference is now made to the accompanying figures in which:

FIG. 3b is a schematic diagram of an illustrative embodiment of the command generation module of FIG. 3a;

FIG. 4b is a flowchart of an illustrative embodiment of the command generation step of FIG. 4a.

DETAILED DESCRIPTION

Figure 1:
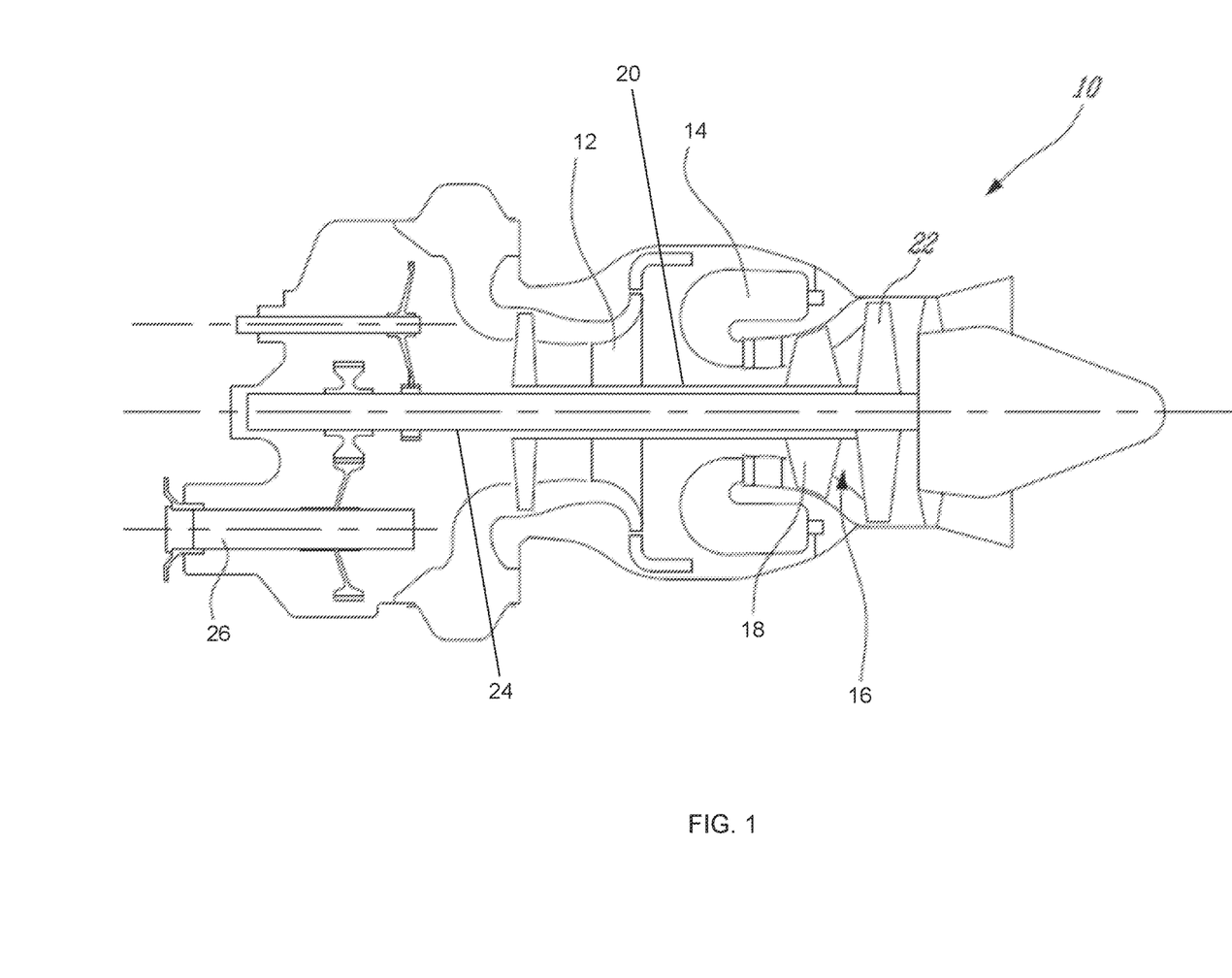
FIG. 1 is a schematic side cross-sectional view of a gas turbine engine.

FIG. 1 illustrates a gas turbine engine 10 of a type preferably provided for use in subsonic flight, generally comprising in serial flow communication a compressor section 12 for pressurizing the air, a combustor 14 in which the compressed air is mixed with fuel and ignited for generating an annular stream of hot combustion gases, and a turbine section 16 for extracting energy from the combustion gases. The turbine section 16 includes a compressor turbine 18 in driving engagement with the compressor section 12 through a high pressure shaft 20, and a power turbine 22 in driving engagement with a power shaft 24. The power shaft 24 is in driving engagement with an output shaft 26 through a reduction gearbox (not shown).

Figure 2:
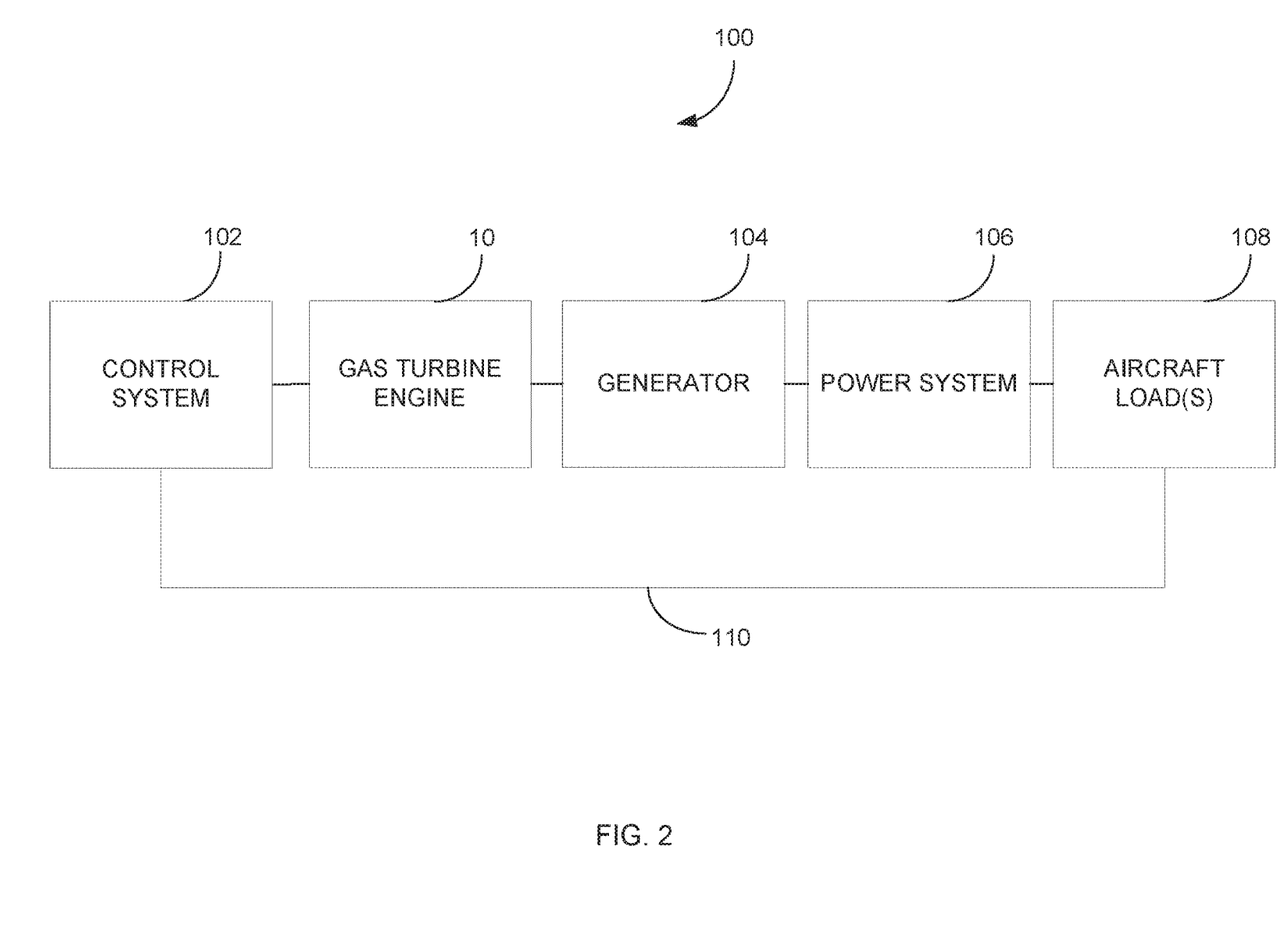
FIG. 2 is a schematic diagram of an aircraft power outtake management system in accordance with an illustrative embodiment.

Referring to FIG. 2, an aircraft power outtake management system 100 will now be described. The system 100 illustratively comprises a control system 102 for controlling the gas turbine engine 10, a generator 104 driven by the gas turbine engine 10, a power system 106 coupled to the generator 104, and at least one aircraft load 108.

The control system 102 may be part of a Full Authority Digital Engine Control (FADEC) used to manage operation of the gas turbine engine 10 by modulating fuel flow thereto, thereby controlling the engine 10 through acceleration, deceleration, and steady state operation. The FADEC may further schedule and control surge protection systems, protect the gas turbine engine 10 from overspeed and overtemperature, perform complete engine start control, as well as control opening of bleed-off valves and engine variable geometries, as discussed below. As such, the control system 102 may comprise a digital computer or Engine Control Unit (ECU, not shown) in communication with the hardware of the engine 10 for controlling an operation of the latter.

The gas turbine engine 10, which illustratively receives as input control signals from the control system 102, may be arranged to drive the generator 104 via a rotating shaft, spool, or the like. The generator 104 may be an electrical generator, a gas generator, a hydraulic pump, or any other generator suitable for supplying energy to the power system 104 to power the aircraft, as known to those skilled in the art. The generator 104 is connected to the power system 106, which may comprise a network of electrically, mechanically, or hydraulically connected machines and devices (not shown). The demands of such devices are illustratively represented collectively as aircraft loads 108, which draw power from the power system 106 via a power distribution bus (not shown), such as an AC or DC power bus, or the like. The aircraft loads 108 may be attributed to machines and devices, such as aircraft navigational equipment, safety equipment, communication equipment, lighting and multimedia equipment, cabin heating and ventilation, aircraft or engine controls, or the like.

The amount of power drawn or consumed by the aircraft loads 108 may be monitored by a device (not shown), such as a sensor, and fed directly to the control system 102, either in a wired manner or wirelessly over a suitable network (not shown). Illustratively, the information is transmitted to the control system 102 in a wired manner using a direct link 110, such as a wire, to connect the control system 102 to the aircraft loads 108. In this manner, the power outtake of the aircraft loads 108 may be received at the control system 102 in real-time during a flight and acted upon to enhance the performance, stability, and reliability of the turbine engine 10 as well as control the amount of power drawn from the power system 106 by the aircraft loads 108, as will be described further below.

Due to the plurality of machines and devices, which may contribute to the aircraft loads 108, the power outtake may be electrical, mechanical, or the like, as will be readily understood by a person skilled in the art. For example, the power outtake may be an electrical load, e.g. an accessory gearbox (AGB) load, on the power system 106. Indeed, an AGB may be mounted on the rear of the gas turbine engine 10 and used to drive engine accessories, such as high-pressure fuel pumps, fuel control units, oil scavenge and oil pressure pumps, as well as aircraft manufacturer provided accessories, such as starter-generators, or fuel boost pumps. Alternatively, the power outtake may be a mechanical load attributed to a pneumatic or hydraulic system, the fan 12, or the compressor 12. For example, pneumatic or hydraulic systems may be pressurized with pumps mechanically driven by the engine 10 for a variety of aircraft applications, such as operating wheel brakes, retractable landing gear, or constant-speed propellers. The power outtake may also result from pressurized bleed air, which may be drawn off the compressor section 12 of the engine 10 and used for pressurization, cooling, and/or heating of the aircraft. It will be understood that other power outtakes may apply. The power outtake may further result from use of a mechanical winch coupled to the engine 10 through the reduction gearbox with a clutching system. Such a winch may be used to haul back rescuees to helicopters during search and rescue missions. It will also be understood that combinations of power outtakes, e.g. electrical and mechanical, may apply.

Figure 3A:
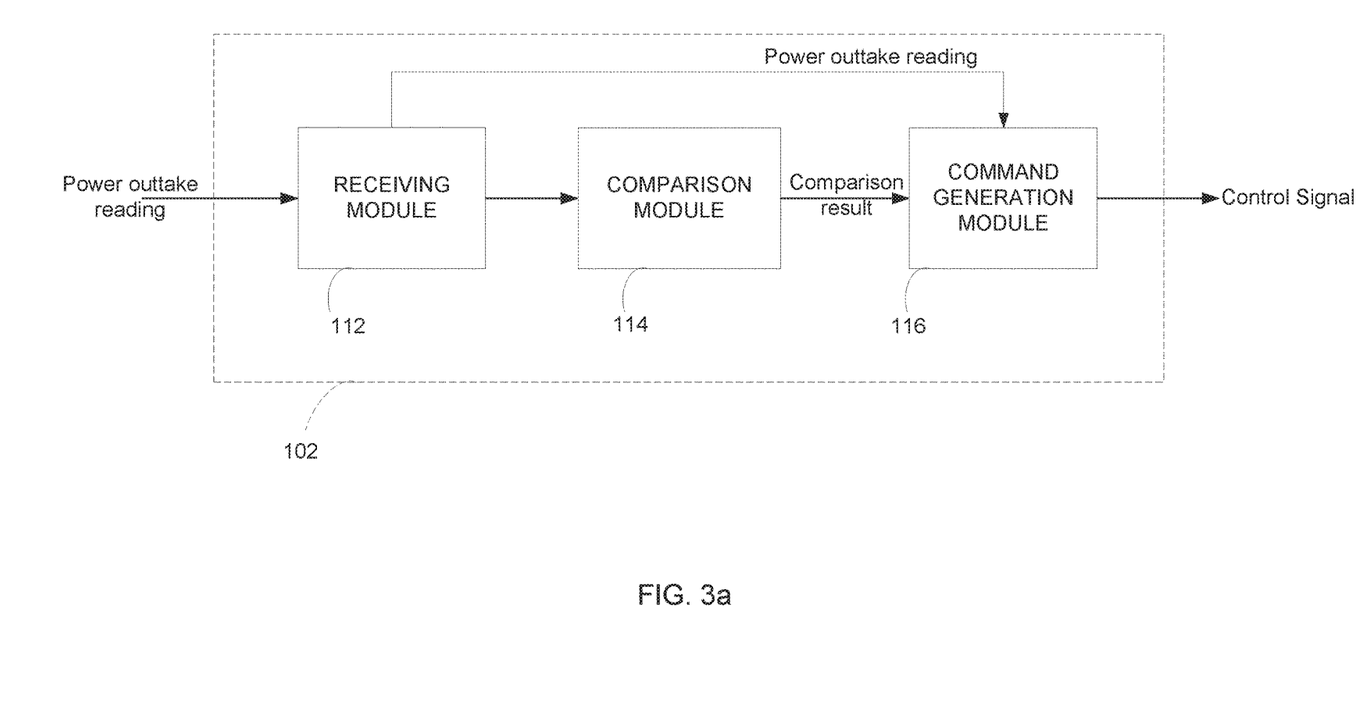
FIG. 3a is a schematic diagram of an illustrative embodiment of a control system of FIG. 2.

FIG. 3a is an exemplary embodiment of the control system 102. The power outtake from the aircraft loads 108 is illustratively received by a receiving module or unit 112, which produces an output that is either transmitted to a comparison module 114 or directly to a command generation module 116. The received power outtake data may be sent to the comparison module 114 for comparing the current power outtake reading to a predetermined threshold fixed by the engine manufacturer for optimal performance of the engine 10. It may therefore be possible to determine whether the current power outtake reading is higher or lower than the threshold. The comparison module 114 may also compare the current power outtake to a previous power outtake reading, which may be stored in a memory, to identify an increase or decrease in power outtake drawn by the aircraft loads 108. For this purpose, the output of the comparison module 114 may be sent to the command generation module 116 so the control system 102 may issue a command for controlling the gas turbine engine 10 according to the result of the comparison, as will be discussed further below. Alternatively, the received power outtake data may be sent directly to the command generation module 116 for generating an engine control command without effecting a prior comparison. This may for example be the case when the power outtake reading is used to monitor the condition of the engine 10. The control signal output by the command generation module 116 illustratively represents the command issued by the control system 102 to control operation of the gas turbine engine 10 and management of the aircraft loads 108, as will be discussed further below.

Figure 3B:
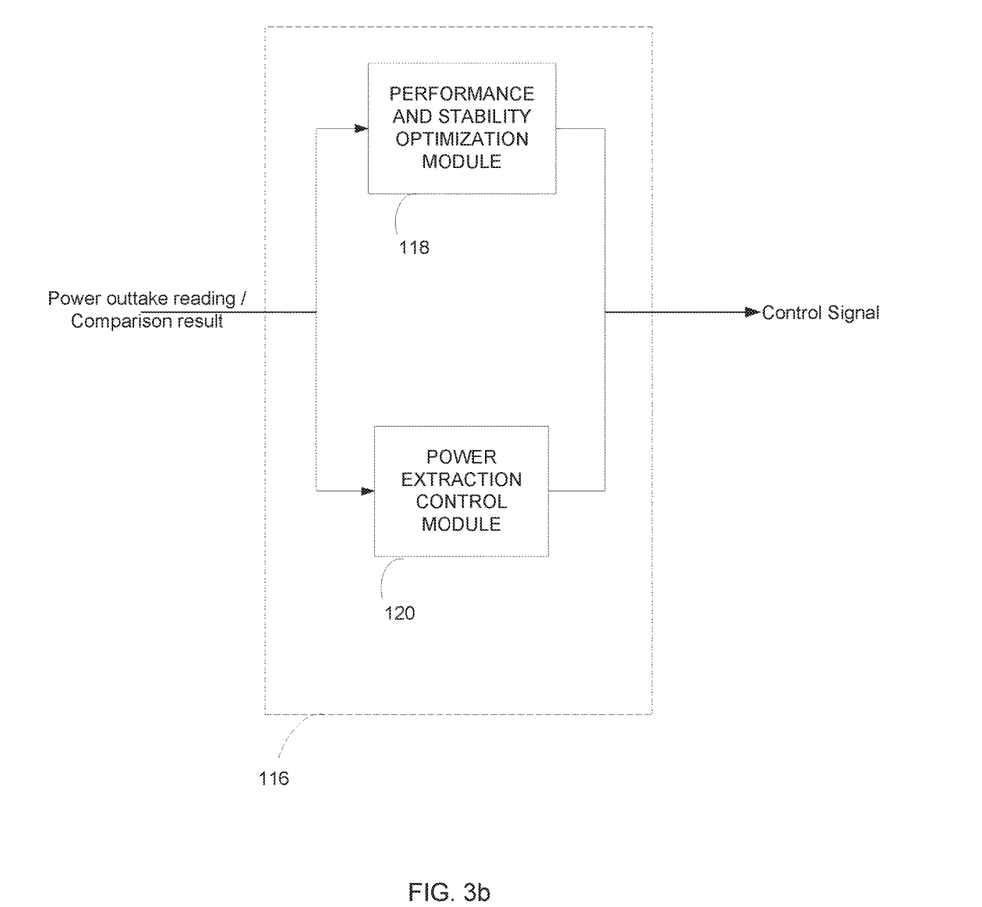

FIG. 3b illustrates the command generation module 116 in more detail. The command generation module 116 illustratively comprises a performance and stability optimization module 118 and a power extraction control module 120, which each receive input from the receiving module 112 or the comparison module 114, depending on the parameter of the gas turbine engine 10 that is to be controlled, e.g. an acceleration reference signal, fuel flow, variable geometry position, load shedding, or the like, as will be discussed further below.

Upon receiving the current power outtake reading, the power extraction control module 120 is illustratively used to control the amount of power extracted from the gas turbine engine 10. Using the received power outtake, the power extraction control module 120 may for instance determine the acceleration capability of the engine 10. This may be achieved through at least one of empirical correlations or characterization of the impact of power outtake on the engine 10 and analytical calculations to compute the tradeoff between extracted power and the equivalent acceleration power. If more acceleration is needed, the power extraction control module 120 may generate a command to the aircraft engine 10 and accordingly to the power system 106 to shed excess load by selectively disconnecting at least one of the aircraft loads 108 from the bus connecting the latter to the power system 106. For example, when rotor loads increase, the engine 10 may need to accelerate in order to prevent low rotor rpm, also referred to as rotor droop, which occurs when the engine 10 cannot drive the rotor blades at sufficient rpm to maintain flight. As a result of the load shedding, less power will be extracted by the aircraft loads 108 and the acceleration capability of the engine 10 may be increased, leading to a reduction in rotor droop. Illustratively, the power extraction control module 120 may only shed excess load from the aircraft loads 108 when additional acceleration capability is needed. As excess load may be shed as needed, higher load conditions may be accommodated and the transient capability of the engine 10 optimized.

In addition, the power extraction control module 120 may issue a command signal for relaxing or increasing the power outtake allowance without adversely impacting engine performance and capability. Indeed, as excess aircraft loads 108 may be shed when needed, there is illustratively no need to assume that the maximum power outtake allowance specified in the engine's installation manual applies. Thus, it may be possible to allow power outtake levels that exceed a threshold defined in the engine specifications. The power extraction control module 120 may therefore issue a control signal for varying the power outtake allowance dynamically according to the current power outtake reading fed back from the aircraft loads 108.

According to the power outtake reading, the power extraction control module 120 may further issue a command to control the power outtake when the engine 10 reaches a thermal limit or when a temperature overshoot level needs to be reduced. Also, when unpredicted events occur, the power extraction control module 120 may, on the basis of the received power outtake reading, limit or stop power extraction in order to recover from the compressor or electrical surge condition affecting the engine 10. Examples of such conditions include, but are not limited to, power surges, overload of the generator 104, and failure of the engine 10. The received power outtake reading may further be used by the power extraction control module 120 to limit or stop power extraction in order to force the aircraft to meet installation manual or operability limits.

Figure 3C:
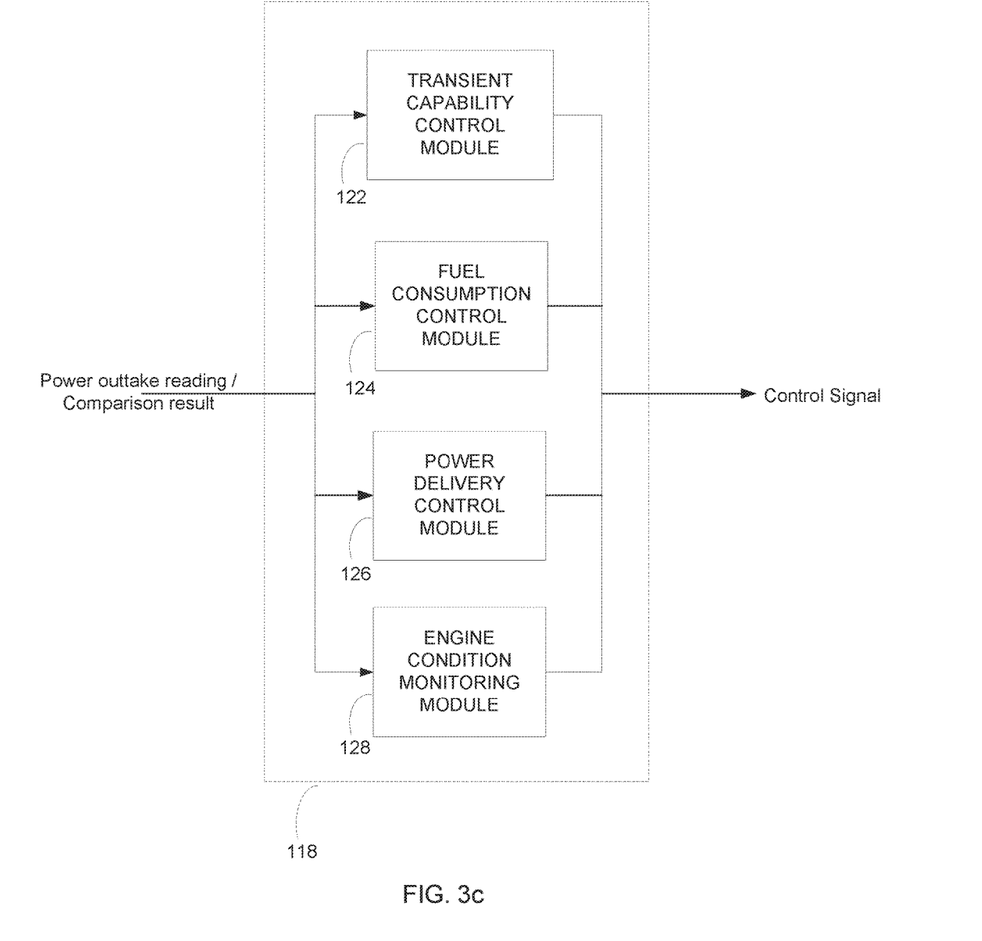
FIG. 3c is a schematic diagram of an illustrative embodiment of the performance and stability optimization module of FIG. 3b.

Referring to FIG. 3c, the performance and stability optimization module 118, which may be used to optimize the performance and stability of the gas turbine engine 10, is illustrated in more detail. The performance and stability optimization module 118 illustratively comprises at least one of a transient capability control module 122, a fuel consumption control module 124, a power delivery control module 126, and an engine condition monitoring module 128. It should be understood that the performance and stability optimization module 118 may comprise additional modules for controlling and optimizing other parameters influencing the operation of the gas turbine engine 10.

The transient capability control module 122 may be used to optimize the transient capability of the gas turbine engine 10 according to the power outtake received at the receiving module 112. In particular, in order to use the maximum of the engine's capability under a given power outtake condition, the acceleration reference signal sent to the engine 10 by the control system 102 may be adjusted in the transient capability control module 122 according to the received power outtake reading. For instance, upon receiving the current reading of the power outtake at the receiving module 112, the received data may be sent to the comparison module 114, which may compare the received power outtake data to a predetermined threshold. The result of the comparison may then be sent to the transient capability control module 122. If the result of the comparison indicates that the power outtake is lower than the threshold and if additional acceleration is needed, the transient capability control module 122 may generate a new acceleration reference signal, which indicates that the acceleration schedule should be increased. The signal may then be sent to the gas turbine engine 10 to yield the desired acceleration.

The power outtake reading may further be used by the transient capability control module 122 to generate a command for adjusting the position of the engine's variable geometries in real-time. This may in turn optimize the performance of the engine 10 and achieve optimal power capability. Such variable geometries include, but are not limited to, Inlet Guide Vanes (IGVs) provided at the inlet of the compressor section 12 and variable stator vanes, which direct incoming air into the rotor blades of the engine 10 at an appropriate angle, bleed valves, and variable turbochargers. In particular, the positioning of the variable geometries may be adjusted according to the engine's surge margin capability to ensure that the engine 10 remains surge-free. For example, upon receiving at the receiving module 112 the power outtake reading, the latter may be sent to the comparison module 114 for comparing the data to a predetermined threshold. If the comparison module 114 determines that the power outtake is higher than the threshold, the result of the comparison may be sent to the transient capability control module 122. On the basis of the comparison, the transient capability control module 122 may then issue a command to the gas turbine engine 10 for opening the engine's bleed valve and closing the IGVs. As a result, the flow of air into the engine 10 may be restricted and the power outtake decreased.

In order to maintain a constant power supply to the engine 10, the amount of fuel flowing therethrough may further be adjusted by the fuel consumption control module 124 according to the power outtake reading. Indeed, as the power outtake drawn by the aircraft loads 108 is illustratively fed to the control system 102 in real-time, the latter may promptly react to a change in power outtake and adjust fuel flow accordingly. Such an adjustment may be done by the fuel consumption control module 124, which may issue a command to the gas turbine engine 10 to control the fuel flowing therein prior to receiving measurements from monitoring devices, such as tachometer-generators, installed on the gas turbine engine 10. For instance, upon receiving the power outtake at the receiving module 112 and detecting at the comparison module 114 a variation in the amount of power drawn by the aircraft loads 108, the fuel consumption control module 124 may, immediately upon receiving the result of the comparison effected by the comparison module 114, issue a command for modulating fuel. This may be done without having to wait for metrics, such as drops in gas generator speed (Ng) or propeller speed (Np), which would result from the power outtake increase, to be received at the receiving module 112 from the monitoring devices. The response of the gas turbine engine 10 to a given condition may therefore be anticipated by the control system 102 on the basis of the sensed change in power outtake.

The stability of the gas turbine engine 10 may further be increased on the basis of the power outtake reading. For instance, knowing the current power outtake and in order to maintain a constant frequency of rotation or revolutions per minute (rpm) of the gas turbine engine 10 as altitude changes, the fuel consumption control module 124 may issue a command to adjust the setting of a throttle and throttle valve, which control the flow of fuel delivered to the gas turbine engine 10. By adjusting the fuel flow, the engine rpm may in turn be controlled.

Moreover, the power delivery control module 126 may be used to ensure that a predetermined level of power is output to the shaft of the gas turbine engine 10. Indeed, the engine 10 may be designed for the worst predicted operating conditions where conservative power outtake estimates are made according to limits imposed by engine specifications. Once the reading of the actual power outtake is received at the receiving module 112 and the power outtake reading is compared to a predetermined threshold at the comparison module 114, the power delivery control module 126 may receive the result of the comparison and accordingly issue a command to adjust the power supplied to the engine 10. For example, the command may result in an increase of the power supply if it is determined that the worst operating conditions have not been reached or in a decrease of the power supply in the opposite case. Adjustment of the power supply may be effected by the power delivery control module 126 generating a command for changing the position of variable geometries of the gas turbine engine 10. For instance, the command issued may result in opening the IGVs or closing the bleed valve when low power outtake is required. Also, as the engine 10 ages, the variable geometries may be adjusted towards a position where fuel consumption is sacrificed for providing additional power to the engine 10. As a result, cycle efficiency can be optimized.

The accuracy of algorithms used for performing power assurance checks may further be increased when the engine condition monitoring module 128 receives the power outtake as input. Indeed, such assurance checks may be performed to monitor the condition of the engine 10. The results of the assurance checks indicate when maintenance action might be required and repair results may be recorded for scheduling maintenance. Since the accuracy of such assurance checks is dependant on the accuracy of the input provided to the algorithm, using the power outtake reading as an additional input may provide more reliable results. In turn, more timely responses to malfunctions may be achieved.

The accuracy of algorithms used in computing the temperature of the gas turbine engine 10 may further be increased using the power outtake as an input to the control system 102. As temperature may be a limiting factor in operation of the engine 10, it is desirable to monitor the temperature thereof. For this purpose, the exhaust temperature of the engine 10 may be measured and a back calculation may be performed to estimate the turbine temperature. However, various factors may increase the temperature of the engine 10 and it is further desirable to be able to discriminate between these factors. For example, an increase in the temperature of the engine 10 may either be associated with a power outtake or engine failure. Thus, factoring in the contribution of the power outtake when estimating the temperature of the engine 10 provides a better indication of the condition thereof as well as increases the accuracy of the temperature estimates. This may be effected by the engine condition monitoring module 128, which may perform temperature estimates on the basis of the exhaust temperature and the power outtake reading received from the receiving module 112. The accuracy of the results may be enhanced by having the power outtake readings directly fed to the control system 10 and, as such, they are more reliable than inputs received from traditional monitoring devices.

Using the control system 102 enables reliable and prompt control of the operation of the engine 10 as well as efficient power management. In addition, feeding the power outtake back to the control system 102 alleviates the need for adding physical hardware, such as current regulators, to the system 100 for achieving such control, thus resulting in a lightweight system 100.

Figure 4A:
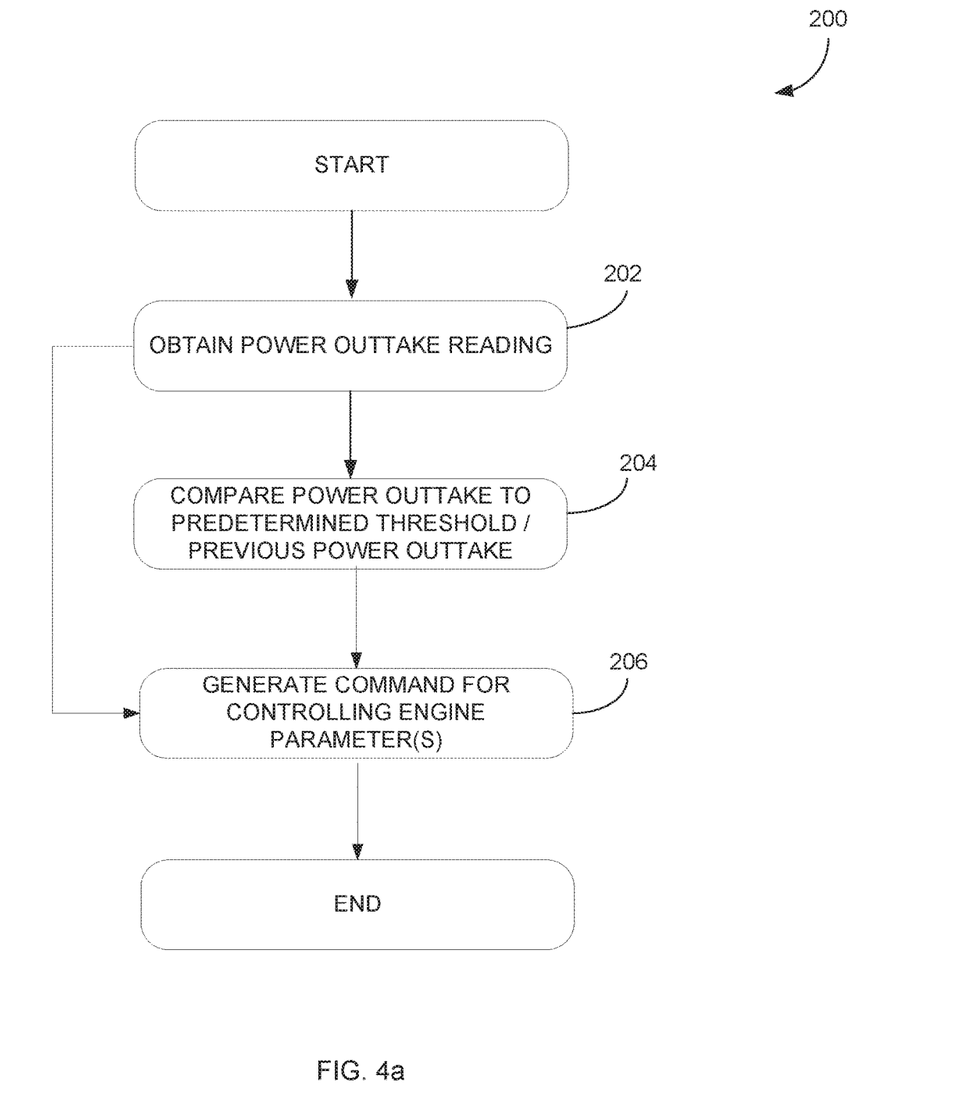
FIG. 4a is a flowchart of a method for managing an aircraft load in accordance with an illustrative embodiment.

Referring now to FIG. 4a, a method 200 for managing aircraft power outtake will be described. The method 200 comprises obtaining at step 202 a current reading of power outtake on the power system 206 of FIG. 2. Once the reading is obtained, the latter may be compared at step 204 to a predetermined threshold to evaluate whether the current power outtake is within predefined limits or to a previous power outtake reading obtained at step 202 to identify a trend, i.e. increase or decrease, in the power outtake. A command may be generated at step 206 to control at least one aircraft engine parameter, such as an acceleration reference signal, fuel flow, variable geometry position, load shedding, according to the current power outtake. Alternatively, the command may be generated directly from the power outtake reading without comparison.

Figure 4B:
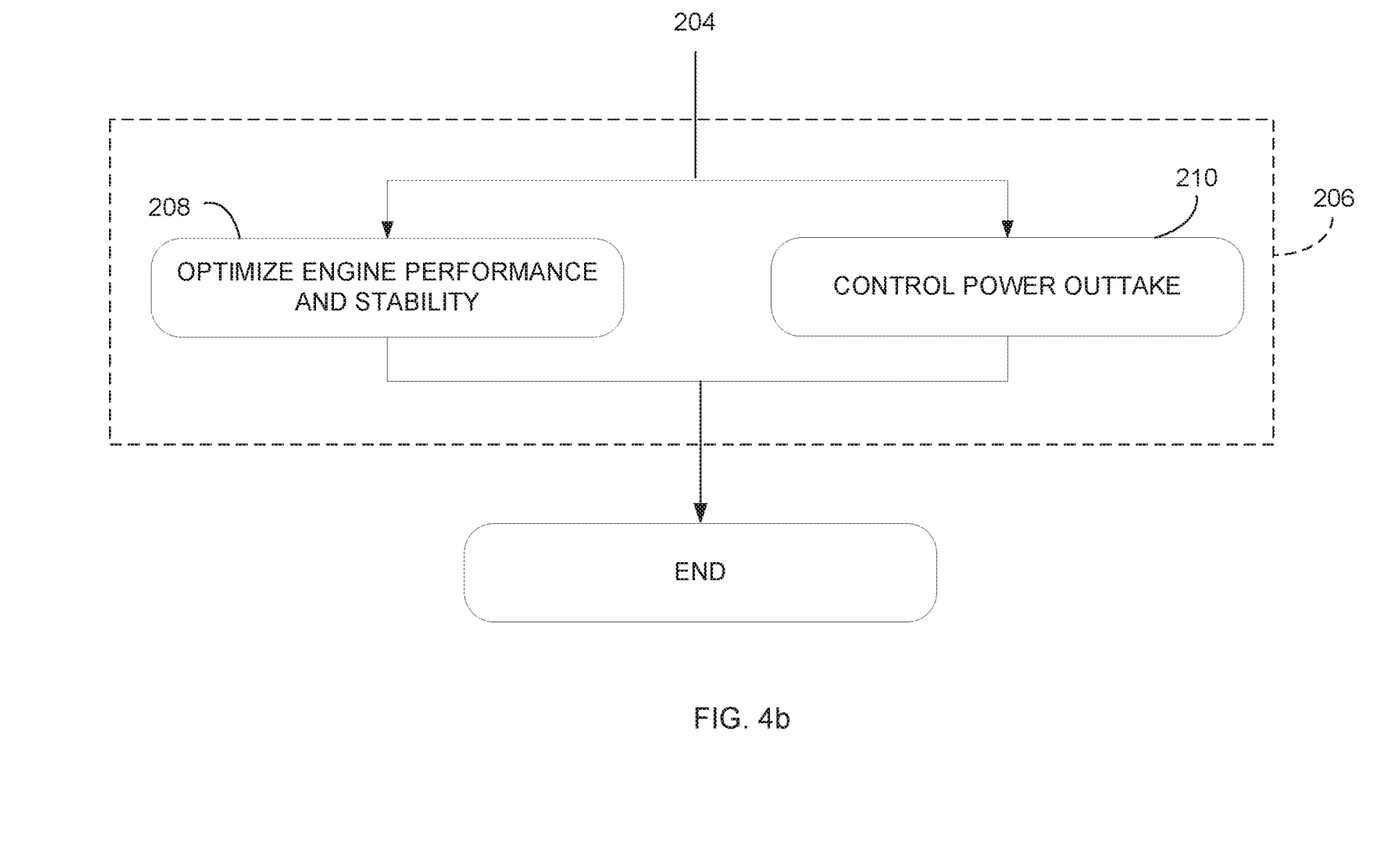

Referring to FIG. 4b, the command generation step 206 illustratively comprises an engine performance and stability optimization step 208 and an engine power extraction control step 210. As discussed above, the power extraction control step 210 may be used to generate a command for the purpose of relaxing or increasing the power outtake levels allowed to the aircraft loads as well as controlling the amount of power extracted from the gas turbine engine 10 to adjust the acceleration capability of the engine 10 or recover from unpredicted events, as discussed above with reference to the system 100 of FIG. 2.

Figure 4C:
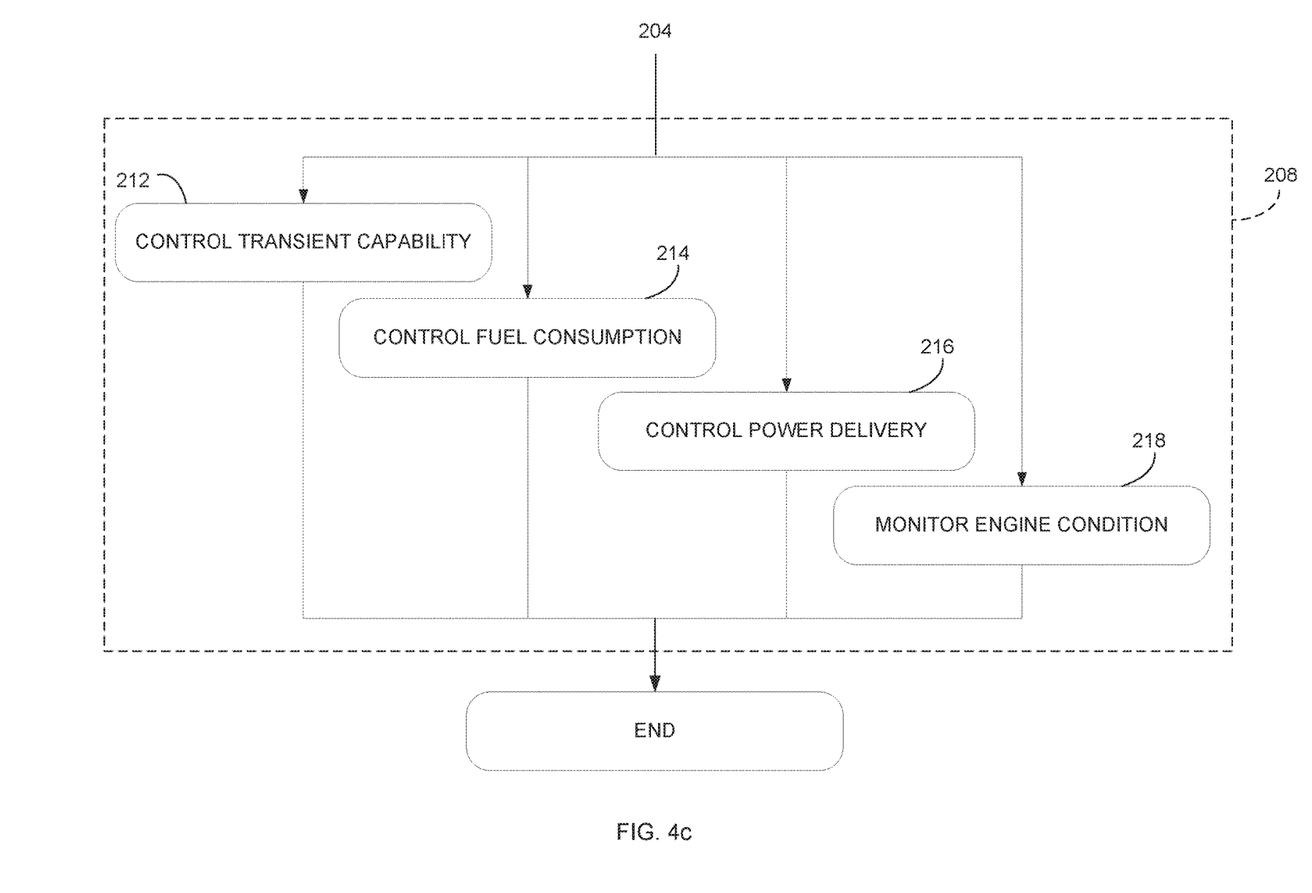
FIG. 4c is a flowchart of an illustrative embodiment of the command generation step of FIG. 4b.

Referring to FIG. 4c, the engine performance and stability optimization step 208 illustratively comprises at least one of a control transient capability step 212, a control fuel consumption step 214, a control power delivery step 216, and a monitor engine condition step 218.

The control transient capability step 212 may involve generating a command for optimizing the transient capability of the engine 10 according to the power outtake reading. For instance, and as discussed above with reference to the system 100 of FIG. 2, the control transient capability step 212 may involve generating a command for adjusting the engine's acceleration reference signal or adjusting the position of the engine's variable geometries in real-time to optimize engine performance and achieve optimal power capability.

The control fuel consumption step 214 may involve generating a command for adjusting in real-time the amount of fuel flowing through the engine 10 in reaction to a change in power outtake. The issued command may also enhance the stability of the engine 10, for example by controlling the throttle setting.

The control power delivery step 216 may involve generating a command to adjust the power supplied to the engine 10 according to the power outtake. It may therefore be ensured that a predetermined level of power is output to the shaft of the gas turbine engine 10.

The monitor engine condition step 218 may involve using the power outtake reading obtained at step 202 to more accurately monitor the condition of the engine 10, for example to enhance the reliability of power assurance checks or temperature estimates.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system or on a computer readable medium. The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for controlling a gas turbine engine supplying power to an aircraft, the system comprising:
a processor; and
a non-transitory computer readable medium having stored thereon programming instructions executable by the processor for:
receiving a measurement signal comprising a measurement of a power outtake of at least one load coupled to the engine, the power outtake corresponding to an amount of power drawn or consumed by the at least one load;
extracting the measurement from the measurement signal;
monitoring a condition of the engine based on the measurement;
generating, in accordance with the measurement, a control signal as a command to dynamically modify a power outtake threshold of the engine when any one of the following occurs: the engine reaches a thermal limit, a temperature overshoot level of the engine reaches a threshold, and an unpredicted event occurs; and
sending the control signal to the engine for dynamically modifying the power outtake threshold.

2. The system of claim 1, wherein the control signal is generated when the unpredicted event occurs, the unpredicted event comprising a compressor or electrical surge condition affecting the engine.

3. The system of claim 1, wherein the control signal is generated when the unpredicted event occurs, the unpredicted event comprising any one of a power surge, a generator overload, and an engine failure.

4. The system of claim 1, wherein dynamically modifying the power outtake threshold comprises enforcing a power outtake limit defined in engine specifications.

5. The system of claim 1, wherein dynamically modifying the power outtake threshold comprises limiting or stopping power extraction.

6. The system of claim 1, wherein the at least one load is a plurality of loads, and wherein the programming instructions are further executable for increasing the power outtake threshold to a level that exceeds a limit defined in engine specifications when one or more loads of the plurality of loads are shed.

7. A method for controlling a gas turbine engine supplying power to an aircraft, the method comprising:
receiving a measurement signal comprising a measurement of a power outtake currently consumed by at least one load coupled to the engine;
extracting the measurement from the measurement signal;
monitoring a condition of the engine based on the measurement;
generating, in accordance with the measurement, a control signal as a command to dynamically modify a power outtake threshold of the engine when any one of the following occurs: the engine reaches a thermal limit, a temperature overshoot level of the engine reaches a threshold, and an unpredicted event occurs; and
sending the control signal to the engine for dynamically modifying the power outtake threshold.

8. The method of claim 7, wherein the control signal is generated when the unpredicted event occurs, the unpredicted event comprising a compressor or electrical surge condition affecting the engine.

9. The method of claim 7, wherein the control signal is generated when the unpredicted event occurs, the unpredicted event comprising any one of a power surge, a generator overload, and an engine failure.

10. The method of claim 7, wherein dynamically modifying the power outtake threshold comprises enforcing a power outtake limit defined in engine specifications.

11. The method of claim 7, wherein dynamically modifying the power outtake threshold comprises limiting or stopping power extraction.

12. The method of claim 7, wherein the at least one load is a plurality of loads, and wherein dynamically modifying the power outtake threshold further comprises increasing the power outtake threshold to a level that exceeds a limit defined in engine specifications when one or more loads of the plurality of loads are shed.

13. A system for controlling a gas turbine engine supplying power to an aircraft, the system comprising:
means for receiving a measurement signal comprising a measurement of a power outtake currently consumed by at least one load coupled to the engine;
means for extracting the measurement from the measurement signal;
means for monitoring a condition of the engine based on the measurement;
means for generating, in accordance with the measurement, a control signal as a command to dynamically modify a power outtake threshold of the engine when any one of the following occurs: the engine reaches a thermal limit, a temperature overshoot level of the engine reaches a threshold, and an unpredicted event occurs; and
means for sending the control signal to the engine for dynamically modifying the power outtake threshold.

* * * * *